United States Patent [19]
Kumar et al.

[11] Patent Number: 5,486,227
[45] Date of Patent: Jan. 23, 1996

[54] INTEGRATED PROCESS FOR PURIFYING AND LIQUEFYING A FEED GAS MIXTURE WITH RESPECT TO ITS LESS STRONGLY ADSORBED COMPONENT OF LOWER VOLATILITY

[75] Inventors: Ravi Kumar, Allentown; Eric W. Scharpf, Emmaus; Charles M. Woods, Germansville, all of Pa.

[73] Assignee: Air Products and Chemicals, Inc., Allentown, Pa.

[21] Appl. No.: 352,256

[22] Filed: Dec. 8, 1994

Related U.S. Application Data

[63] Continuation of Ser. No. 132,397, Oct. 6, 1993, abandoned.

[51] Int. Cl.⁶ .................................................. B01D 53/047
[52] U.S. Cl. .................................. 95/41; 95/99; 95/101; 95/105; 95/115; 95/117; 95/125; 95/126; 62/18
[58] Field of Search .................. 62/17, 18; 95/39, 95/41, 96–106, 115–117, 123–126

[56] References Cited

U.S. PATENT DOCUMENTS

| | | | |
|---|---|---|---|
| 3,838,553 | 10/1974 | Doherty | 95/98 |
| 3,894,856 | 7/1975 | Lofredo et al. | 95/115 |
| 4,249,915 | 2/1981 | Sircar et al. | 62/18 X |
| 4,472,178 | 9/1984 | Kumar et al. | 95/99 |
| 4,557,735 | 12/1985 | Pike | 95/99 |
| 4,761,167 | 8/1988 | Nicholas et al. | 95/98 X |
| 4,770,676 | 9/1988 | Sircar et al. | 55/26 |
| 4,861,361 | 8/1989 | Jain et al. | 95/96 X |
| 4,963,339 | 10/1990 | Krishnamurthy et al. | 95/116 X |
| 5,100,635 | 3/1992 | Krishnamurthy et al. | 95/96 X |
| 5,110,569 | 5/1992 | Jain | 95/123 X |
| 5,125,934 | 6/1992 | Krishnamurthy et al. | 95/101 |

OTHER PUBLICATIONS

R. Kumar, et al., "Thermal swing adsorption process for removing trace impurities...", 1991 vol. 5, pp. 21–24 *Gas Separation & Purification*.

*Primary Examiner*—Robert Spitzer
*Attorney, Agent, or Firm*—Robert J. Wolff

[57] ABSTRACT

A process is set forth for purifying and liquefying a feed gas mixture with respect to its less strongly adsorbed component of lower volatility which integrates temperature swing adsorption (TSA), pressure swing adsorption (PSA) and cryogenic distillation to optimize overall performance. The TSA portion of the process is used to remove the strongly adsorbed component from the feed; the PSA portion of the process is used to remove the moderately strongly adsorbed component from the feed; and the cryogenic distillation portion of the process is used to remove the less strongly adsorbed component of higher volatility from the feed while also providing for the liquefaction of the product. A key to the present invention is the use of the PSA and distillation waste streams in the regeneration of the TSA and PSA adsorbents. An important application of the present invention is the purification and liquefaction of a natural gas feed stream with respect to its methane/$C_2$ hydrocarbon component.

6 Claims, 1 Drawing Sheet

1

INTEGRATED PROCESS FOR PURIFYING AND LIQUEFYING A FEED GAS MIXTURE WITH RESPECT TO ITS LESS STRONGLY ADSORBED COMPONENT OF LOWER VOLATILITY

This is a continuation of application Ser. No. 08,132,397 filed 10/06/93, now abandoned.

TECHNICAL FIELD

The present invention relates to a process for purifying and liquefying a feed gas mixture with respect to its less strongly adsorbed component of lower volatility which integrates temperature swing adsorption, pressure swing adsorption and cryogenic distillation to optimize overall performance. An important application of the present invention is the purification and liquefaction of a natural gas feed stream with respect to its methane/$C_2$ hydrocarbon component.

BACKGROUND OF THE INVENTION

A process for purifying a feed gas mixture with respect to its less strongly adsorbed component which integrates temperature swing adsorption (TSA) and pressure swing adsorption (PSA) to optimize overall performance is taught in the art. Specifically, U.S. Pat. No. 4,770,676 by Sircar et al. teaches such a process in the context of purifying a landfill feed gas mixture with respect to it methane component. Sircar's process comprises:

(a) passing the feed gas mixture through a temperature swing adsorption bed containing an adsorbent selective for the retention of the strongly adsorbed component to produce an adsorption bed saturated with the strongly adsorbed component and a temperature swing effluent stream enriched in the moderately adsorbed component and the less strongly adsorbed component (the strongly adsorbed component will generally comprise the species water, $C_4$+hydrocarbons and sulfur-containing compounds; the moderately adsorbed component will generally comprise the species carbon dioxide and $C_3$ hydrocarbons; and the less strongly adsorbed component will generally comprise the species methane and $C_2$ hydrocarbons);

(b) regenerating the temperature swing adsorption bed via:

(1) heating the TSA bed by heating a first regeneration gas and subsequently passing the heated first regeneration gas through the TSA bed in order to vaporize and desorb at least a portion of the strongly adsorbed component from the TSA bed; and (2) cooling the TSA bed to the temperature of the TSA bed in step (a) by passing a second regeneration gas through the TSA bed;

(c) passing the temperature swing effluent stream through a pressure swing adsorption bed containing an adsorbent selective for the retention of the moderately adsorbed component to produce an adsorption bed saturated with the moderately adsorbed component and a pressure swing effluent stream, enriched in the less strongly adsorbed product component;

(d) regenerating the pressure swing adsorption bed via:

(1) depressurizing the PSA bed to produce a depressurization effluent stream enriched in the moderately strongly adsorbed component wherein a first portion of said depressurization effluent stream is used as at least a portion of the first regeneration gas in step (b) (1) and wherein a second portion of said depressurization effluent stream is used as at least a portion of the second regeneration gas in step (b) (2); and (2) repressurizing the PSA bed to the pressure of the PSA bed in step (c) with a third regeneration gas.

There is a problem with Sircar, however, when the less adsorbable component of the feed gas mixture contains significant quantities of a species which is not desired in the product stream such as nitrogen. The problem is that such a species will not be removed by Sircar's process and thus contaminates the product produced in step (c). Furthermore, Sircar does not produce his product in the liquid state which is often required where the product is to be transported and/or used as a liquid fuel. The present invention overcomes these problems by integrating a cryogenic distillation section into Sircar.

An important application of the present invention is the purification and liquefaction of a natural gas feed stream with respect to its methane/$C_2$ hydrocarbon component. This application is important because, as the awareness of the benefits from clean air increases, there is a trend towards replacing petroleum fuels by liquid methane in the transportation industry. Although the United States has an abundance of natural gas, it contains impurities such as water, sulfur-containing compounds, light hydrocarbons (ie $C_3$ hydrocarbons; note that $C_2$ hydrocarbons are generally not considered an impurity), heavy hydrocarbons (ie $C_4$+hydrocarbons) and carbon dioxide which have to be removed prior to liquefaction to obtain the liquid methane/$C_2$ hydrocarbon product.

SUMMARY OF THE INVENTION

The present invention is a process for purifying and liquefying a feed gas mixture with respect to its less strongly adsorbed component of lower volatility which integrates temperature swing adsorption (TSA), pressure swing adsorption (PSA) and cryogenic distillation to optimize overall performance. The TSA portion of the process is used to remove the strongly adsorbed component from the feed; the PSA portion of the process is used to remove the moderately strongly adsorbed component from the feed; and the cryogenic distillation portion of the process is used to remove the less strongly adsorbed component of higher volatility from the feed while also providing for the liquefaction of the product. A key to the present invention is the use of the PSA and distillation waste streams in the regeneration of the TSA and PSA adsorbents. An important application of the present invention is the purification and liquefaction of a natural gas feed stream with respect to its methane/$C_2$ hydrocarbon component.

DETAILED DESCRIPTION OF THE INVENTION

Figure 1:
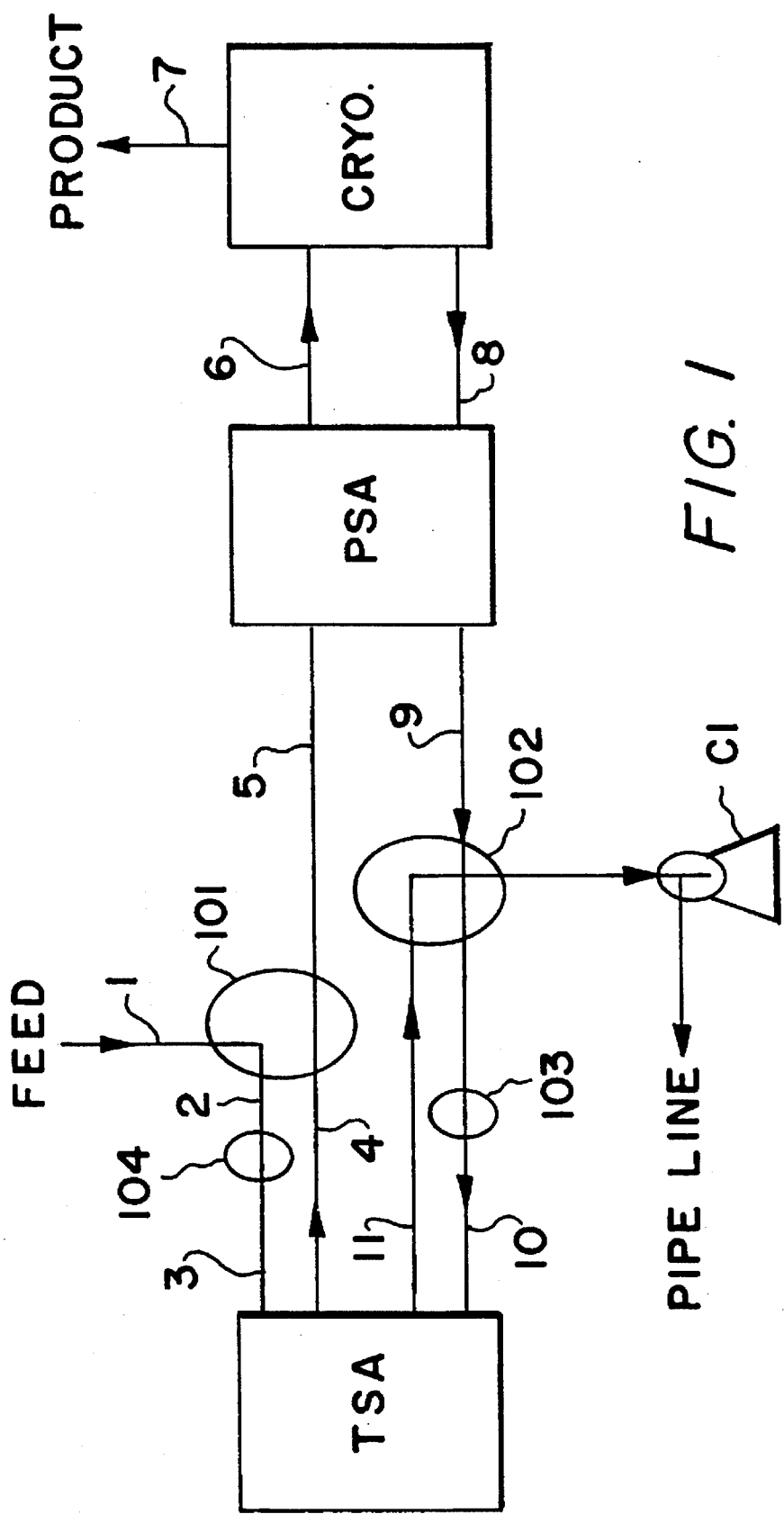
FIG. 1 is a schematic diagram illustrating one embodiment of the present invention wherein a natural gas feed stream is purified and liquefied with respect to its methane/$C_2$ hydrocarbon component.

The process of the present invention is best illustrated with reference to a specific embodiment thereof such as FIG. 1's embodiment. FIG. 1's process configuration consists of a thermal swing adsorption unit labeled TSA, a pressure swing adsorption unit labeled PSA and a cryogenic distillation unit labeled CRYO. FIG. 1's process configuration also consists of compressor C1, heat exchangers 101 and 102, heater 103, and chiller 104.

Referring now to FIG. 1, a natural gas feed stream I (such as that obtained from a natural gas pipeline) comprising water, $C_4$+hydrocarbons, sulfur-containing compounds, carbon dioxide, $C_3$ hydrocarbons, methane, $C_2$ hydrocarbons and nitrogen flows through heat exchanger 101 where it is cooled to a low temperature. Exit stream 2 from heat exchanger 101 is further cooled by chiller 104 to temperatures just above the dew point of any species in the natural gas feed. The cold gas stream 3 is fed to the thermal swing adsorption unit. This unit removes the relatively strongly adsorbed water, sulfur compounds and $C_4$+hydrocarbons. It is typically a multi-bed system. It may also use the concept of high-low temperature pretreatment as described in "Thermal Swing Adsorption Process for Removing Trace Impurities from a Multicomponent Gas Mixture: (Landfill Gas)" by R. Kumar and T. C. Golden; Gas Separation and Purification, 1991, Vol. 5, pp 21–24. In an optional configuration, the TSA unit i s fed at ambient temperature eliminating the need for heat exchanger 101 and chiller 104.

At a minimum, the process steps that take place within the TSA unit include the following:

(1) an adsorption step wherein the feed stream 3 is passed through an adsorption bed containing an adsorbent selective for the retention of water, $C_4$+hydrocarbons and sulfur-containing compounds to produce an adsorption bed saturated with water, $C_4$+hydrocarbons and sulfur-containing compounds and an effluent stream enriched in carbon dioxide, $C_3$ hydrocarbons, methane, $C_2$ hydrocarbons and nitrogen;

(2) a regeneration sequence comprising the steps of:

(a) heating the adsorption bed by heating a first regeneration gas and subsequently passing the heated first regeneration gas through the temperature swing adsorption bed in order to vaporize and desorb at least a portion of the water, $C_4$+hydrocarbons and sulfur-containing compounds from the temperature swing adsorption bed; and (b) cooling the adsorption bed to the adsorption step temperature by passing a second regeneration gas through the bed.

The effluent stream 11 from the above regeneration sequence is compressed in compressor Cl and returned to the natural gas pipeline.

Product from the TSA unit, stream 4, is at high pressure, cold, and contains carbon dioxide, $C_3$ hydrocarbons, methane, $C_2$ hydrocarbons and nitrogen. This stream cools the incoming feed stream 1 and heats up to near ambient temperature in heat exchanger 101. Exit stream 5 is fed to the pressure swing adsorption unit. This unit removes the moderately strongly adsorbed carbon dioxide and $C_3$ hydrocarbons. Similar to the TSA unit, the PSA unit is typically a multi-bed system. At a minimum, the process steps that take place within the PSA unit include:

(1) an adsorption step wherein the feed stream 5 is passed through an adsorption bed containing an adsorbent selective for the retention of carbon dioxide and $C_3$ hydrocarbons to produce an adsorption bed saturated with carbon dioxide and $C_3$ hydrocarbons and an effluent stream enriched in methane, $C_2$ hydrocarbons and nitrogen;

(2) a regeneration sequence comprising the steps of:

(a) depressurizing the adsorption bed to produce a depressurization effluent/waste stream 9 enriched in carbon dioxide and $C_3$ hydrocarbons wherein a first portion of said depressurization effluent stream is used as at least a portion of the first regeneration gas in the TSA unit and wherein a second portion of said depressurization effluent stream is used as at least a portion of the second regeneration gas in the TSA unit; and (b) repressurizing the adsorption bed to the adsorption step pressure with a third regeneration gas.

As shown in FIG. 1, waste stream 9 from the PSA unit is heated first by heat exchanging it with TSA regeneration effluent (stream 11) in heat exchanger 102 and then by heater 103 prior to being used as hot regeneration gas for the TSA adsorption beds in stream 10. As an option, the TSA beds can be cooled by stream 9 after the hot regeneration step with the benefit of preheating stream 9 for further use as hot regeneration gas after additional makeup heating in heater 103 and/or heat exchanger 102.

Other process steps that can take place within the PSA unit include the following steps taught in the PSA art:

(1) purging/rinsing the adsorption bed with a less adsorbable component either immediately before or immediately after the depressurization step;

(2) one or more pressure equalization transfers between parallel beds of multi-bed units; and (3) depressurization to sub-ambient pressure levels (ie vacuum swing adsorption or VSA).

Product stream 6 from the PSA unit is fed to a distillation column in the cryogenic distillation unit to produce an overhead stream 8 which is mainly nitrogen and a bottoms stream 7 consisting of the liquid methane/$C_2$ hydrocarbon product stream. A key to the present invention is the utilization of stream 8 in the process. As shown in FIG. 1, stream 8 is fed to the PSA unit to serve as at least a portion of the third regeneration gas in the PSA regeneration sequence. Stream 8 can also be used as at least a portion of the first and/or second regeneration gases in the TSA regeneration sequence. To the extent that the PSA unit uses a purge/rinse step as discussed above, a portion of stream 8 can also be used as the purge/rinse gas.

Regarding the adsorbents used in the TSA and PSA adsorption beds, any adsorbent(s) capable of selectively adsorbing natural gas impurities may be used. Multi-layers of adsorbents may also be used. Examples of such adsorbents are zeolites, aluminas, activated carbons and silica gels.

It should be noted in the above embodiment that, depending on the adsorbent(s) used and the exact composition of the feed gas, the water and heavy hydrocarbons could be considered part of the moderately strongly adsorbed component to be removed primarily by the PSA unit vis-a-vis part of the strongly adsorbed component to be removed primarily by the TSA unit. Similarly, the $C_2$ hydrocarbons could be considered part of the moderately strongly adsorbed component to be removed by the PSA unit if $C_2$ hydrocarbons are not desired in the liquid product.

The present invention has been described with reference to a specific embodiment thereof. This embodiment should not be seen as a limitation of the scope of the present invention; the scope of such being ascertained by the following claims.

We claim:

1. Regarding a feed gas mixture consisting of a strongly adsorbed component, a moderately strongly adsorbed component, a first less strongly adsorbed component, and a second less strongly adsorbed component of lower volatility than the first less strongly adsorbed component, a process for purifying and liquefying the feed gas mixture with respect to the second less strongly adsorbed component comprising the steps of:

(a) passing the feed gas mixture through a temperature swing adsorption bed containing an adsorbent selective for the retention of the strongly adsorbed component to produce an adsorption bed saturated with the strongly adsorbed component and a temperature swing effluent stream enriched in the moderately strongly adsorbed component, the first less strongly adsorbed component and the second less strongly adsorbed component;

(b) regenerating the temperature swing adsorption bed wherein said regenerating in this step (b) comprises the steps of:

(1) heating the temperature swing adsorption bed by heating a first regeneration gas and subsequently passing the heated first regeneration gas through the temperature swing adsorption bed in order to vaporize and desorb at least a portion of the strongly adsorbed component from the temperature swing adsorption bed; and (2) cooling the temperature swing adsorption bed to the temperature of the temperature swing adsorption bed in step (a) by passing a second regeneration gas through the adsorption bed;

(c) passing the temperature swing effluent stream through a pressure swing adsorption bed containing an adsorbent selective for the retention of the moderately strongly adsorbed component to produce an adsorption bed saturated with the moderately strongly adsorbed component and a pressure swing effluent stream enriched in the first less strongly adsorbed component and the second less strongly adsorbed component;

(d) regenerating the pressure swing adsorption bed wherein said regenerating in this step (d) comprises the steps of:

(1) depressurizing the pressure swing adsorption bed to produce a depressurization effluent stream enriched in the moderately strongly adsorbed component wherein a first portion of said depressurization effluent stream is used as at least a portion of the first regeneration gas in step (b)(1) and wherein a second portion of said depressurization effluent stream is used as at least a portion of the second regeneration gas in step (b)(2); and (2) repressurizing the pressure swing adsorption bed to the pressure of the pressure swing adsorption bed in step (c) with a third regeneration gas;

(e) passing the pressure swing effluent stream into a distillation column to produce an overhead stream enriched in the first less strongly adsorbed component and a liquid bottoms stream enriched in the second less strongly adsorbed component wherein at least a portion of said overhead stream is used as at least a portion of the third regeneration gas in step (d)(2).

2. The process of claim 1 wherein:

(a) the strongly adsorbed component comprises water, $C_4+$ hydrocarbons and sulfur-containing compounds;

(b) the moderately strongly adsorbed component comprises carbon dioxide and $C_3$ hydrocarbons;

(c) the first less strongly adsorbed component comprises nitrogen; and (d) the second less strongly adsorbed component comprises methane and $C_2$ hydrocarbons.

3. The process of claim 2 wherein the feed gas mixture is obtained from a pipeline, wherein an effluent is produced from steps (b)(1) and (b)(2) and wherein the effluent from steps (b)(1) and (b)(2) is returned to the pipeline.

4. The process of claim 1 wherein, immediately prior to step (d)(2), the process further comprises purging/rinsing the pressure swing adsorption bed at approximately the pressure level of the bed at the end of step (d)(1) with a stream comprising a portion of the overhead produced in step (e).

5. The process of claim 1 wherein:

(a) the strongly adsorbed component comprises sulfur-containing compounds;

(b) the moderately strongly adsorbed component comprises water, $C_4+$ hydrocarbons, carbon dioxide, $C_3$ hydrocarbons and $C_2$ hydrocarbons;

(c) the first less strongly adsorbed component comprises nitrogen; and (d) the second less strongly adsorbed component comprises methane.

6. The process of claim 1 wherein a portion of said overhead stream from step (e) is also used as at least a portion of the first regeneration gas in step (b)(1) and/or the second regeneration gas in step (b)(2).

* * * * *